(12) United States Patent
Kim et al.

(10) Patent No.: US 6,335,781 B2
(45) Date of Patent: *Jan. 1, 2002

(54) METHOD FOR MANUFACTURING AN LCD IN WHICH A PHOTORESIST LAYER IS AT LEAST 1.2 TIMES THICKER THAN THE PASSIVATION LAYER

(75) Inventors: Woong Kwon Kim, Kyoungki-do; Kyoung Nam Lim, Seoul, both of (KR)

(73) Assignee: LG Electronics, Inc., Seoul (KR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/213,705

(22) Filed: Dec. 17, 1998

(51) Int. Cl.[7] ................................................. G02F 1/13
(52) U.S. Cl. ........................................ 349/187; 430/317
(58) Field of Search .......................... 430/317; 349/187, 349/138

(56) References Cited

U.S. PATENT DOCUMENTS 5,003,356 A  3/1991  Wakai et al. .................. 357/4
5,926,235 A  * 7/1999  Han et al. ..................... 349/43
6,001,539 A  * 12/1999  Lyu et al. ..................... 430/317

FOREIGN PATENT DOCUMENTS

| JP | 6473316 A | 3/1989 |
| JP | 1281435 A | 11/1989 |
| JP | 34536 A | 1/1991 |
| JP | 3142830 A | 6/1991 |
| JP | 5267239 A | 10/1993 |

* cited by examiner

Primary Examiner—Walter J. Malinowski
(74) Attorney, Agent, or Firm—Birch, Stewart, Kolasch & Birch, LLP

(57) ABSTRACT

A method for manufacturing a liquid crystal display has a TFT functioning as a switching elements, a passivation layer covering the TFT and a pixel electrode connected to an output electrode of the TFT on the passivation layer. The method includes coating a photoresist on the passivation layer so that the photoresist has a thickness of more than about 1.2 times the passivation layer. The photoresist is patterned to have a predetermined shape, and the passivation layer is etched according to the patterned photoresist. The remaining photoresist is removed, and treating the surface of the passivation layer with $O_2$ yields a $SiO_2$ thin layer on the passivation layer. A pixel electrode is formed on the passivation layer by depositing and patterning an ITO layer.

14 Claims, 8 Drawing Sheets

METHOD FOR MANUFACTURING AN LCD IN WHICH A PHOTORESIST LAYER IS AT LEAST 1.2 TIMES THICKER THAN THE PASSIVATION LAYER

BACKGROUND OF THE INVENTION

1. Field of the Invention

The present invention relates to a method of patterning a pixel electrode of a liquid crystal display (LCD) device including a switching element for driving and controlling a liquid crystal. More specifically, the present invention relates to a patterning method for manufacturing a liquid crystal display having a TFT (thin film transistors) functioning as a switching element in which a passivation layer covers the TFT and a pixel electrode is connected to an output electrode of the TFT on the passivation layer, and also relates to a structure of a liquid crystal display device manufactured by this method.

2. Description of the Background Art

Conventionally, an LCD has a structure as shown in FIG. 1 which illustrates a plane view of an enlarged LCD panel. A gate line 17 is arranged to extend in a horizontal direction and a data line 15 is arranged to extend in a vertical direction which crosses the gate line 17 perpendicularly. At the intersection portion of the gate line 17 and the data line 15, a TFT including a gate electrode 17a, a source electrode 15a, a drain electrode 15b and a semiconductor layer 22 is formed. A passivation layer (not shown) is formed thereon. A pixel electrode 4 connected to the drain electrode 15b is formed on the passivation layer 22.

When patterning the pixel electrode 4 according to the conventional method, the actual patterned shape is often different from the originally designed shape or desired shape. FIG. 2 shows the typically distorted shape of the pixel electrode 4 after being patterned by the conventional method.

The dotted line 55 in FIG. 2 is the boundary of the originally designed shape of the pixel electrode 4. As seen in FIG. 2, the pixel electrode 4 has a distorted boundary portion having a width W2 and tearing-off portions 20 in the pixel electrode. Here, $W_1$ is a width of the data line 15.

Referring to FIGS. 3a–3j which are cross-sectional views cut along the a—a line of the FIG. 1, a conventional method for manufacturing the LCD will be explained in order to illustrate the reason for the pixel electrode having an undesired pattern shown in FIG. 2.

On a transparent substrate 11, a metal selected from the group of aluminum (Al), aluminum alloy, chromium (Cr) or molybdenum (Mo) is deposited to form a first metal layer 50. A photoresist 51 is coated on the first metal layer 50 as shown in FIG. 3A.

The photoresist 51 is patterned to have a predetermined shape. Using a wet etching method, the first metal layer 50 is patterned according to the shape of the photoresist 51 to form a gate line (not shown) and to form a gate electrode 17a which is derived from the gate line. Then the remaining photoresist on the gate line and the gate electrode 17a is removed as shown in FIG. 3B. The gate electrode 17a can be anodized to eliminate hillocks thereon. In addition, the cross-sectional shape of the gate electrode 17a preferably has a tapered shape.

On the substrate having the gate electrode 17a, a gate insulating layer 23 including an inorganic insulating material such as $SiN_x$ or $SiO_x$, an amorphous silicon (or a-Si) 52 and an $n^+$ type impurity doped a-Si (or N+ type a-Si) 53 are sequentially deposited. A photoresist 51 is coated thereon as shown in FIG. 3C.

The photoresist 51 is patterned to have a predetermined shape. According to the patterned photo resist 51, the a-Si material 52 and the n+type a-Si material 53 are simultaneously etched to form a semiconductor layer 22 and an ohmic contact layer 25. The remaining, photoresist 51 on the ohmic contact layer 25 is removed as shown in FIG. 3D.

A second metal layer 54 including chromium or aluminum is deposited and a photo resist 51 is coated on the second metal layer 54 as shown in FIG. 3E.

The photoresist 51 is patterned to have a predetermined shape. According to the patterned photoresist 51, the second metal layer 54 is patterned via a wet etching method to form a data line 15. At the same time, a source electrode 15a derived from the data line 15 and a drain electrode 15b which faces the source electrode 15a are formed on the ohmic contact layer 25 whereas the source electrode 15a and the drain electrode 15b are separated via a distance. The $n^+$ type a-Si material 53 between the source electrode 15a and the drain electrode 15b is removed via a dry etching method using the source electrode 15a and the drain electrode 15b as a mask. The remaining photoresist on the source electrode 15a and the drain electrode 15b is removed as shown in FIG. 3F.

A passivation layer 26 including an organic material such as BCB (or benzocyclobutene) is coated thereon via a spin coating method. The photoresist 51 is coated so as to have a thickness that is less than a thickness of the passivation layer 26 as shown in FIG. 3G.

The photoresist 51 is patterned to have a predetermined shape. According to the patterned photoresist 51, the passivation layer 26 is patterned via a dry etching method to form a contact hole 30 which exposes some portions of the drain electrode 15b. The remaining photoresist on the passivation layer 26 is removed as shown in FIG. 3H.

On the passivation layer 26, an ITO(or Indium Tin Oxide) 55 is deposited so as to have a thickness of about 500 Å. On the ITO layer 55, a photoresist 51 is coated as shown in FIG. 3I.

The photoresist 51 is patterned to have a predetermined shape. According to the patterned photo resist 51, the ITO layer 55 is patterned via a wet etching method to form a pixel electrode 4 as shown in FIG. 3J.

In the above mentioned conventional method, because the passivation layer 26 has a lower dielectric constant (lower than 3.0) than the inorganic material and forms an organic insulating layer (BCB) which can even a surface property thereof, the pixel electrode 4 disposed on the passivation layer can be overlapped with the data line 15 so that the aperture ratio can be maximized.

However, after the passivation layer 26 including an organic material such as BCB is patterned by using a photo resist 51 as shown in FIGS. 3G and 3H, the surface of the patterned passivation layer 26 can be rough and uneven.

If the pixel electrode 4 is formed on the uneven surface of the passivation layer 26, the patterned pixel electrode 4 has distorted edge portions and tearing-off portions as shown in FIG. 2.

The cause of the formation of the distorted pattern is explained hereafter in detail.

When the passivation layer having an Si bond structure such as BCB is patterned, the substrate which has the passivation layer and patterned photo resist is inserted into an etching chamber filled with an etching gas such as $O_2/SF_6$ or $O_2/CF_4$. The portions of the passivation layer exposed through the patterned photo resist are removed by changing a volatile material SiF4 according to the chemical reaction of the Si functional group of the passivation layer and the F radical of the $SF_6$ or $CF_4$. At the same time, the photo resist is removed by ashing with $O_2$ gas.

As the etching speed of the passivation layer and the ashing speed of the photoresist is similar, the thickness of the photoresist is the same as that of the passivation layer. So, when the patterning of the passivation layer is finished, the photoresist is almost completely removed.

However, it is very difficult to coat the photoresist to have a uniform thickness. Therefore, after the patterning of the passivation layer is finished, the portions where the photoresist is thicker have some remaining photoresist. Otherwise, at the portion where the photo resist is thinner, some surfaces of the passivation layer are over-etched by the etching gas as shown in FIG. 4.

For example, when $O_2/CF_4$ is used as the etching gas, the ratio of the composed atoms at the surface of the over etched passivation layer is determined to be Si:C:O:F= 2–3:58:24:10. Even if the surface is treated with $O_2$ gas, the surface of the passivation layer is still uneven because of the F radical.

If the ITO layer is deposited on the uneven passivation layer, the ITO is not deposited at the convex portions 20 which have the extruded passivation layer as shown in FIG. 5. A photoresist is then deposited and patterned on the ITO layer 60 which is not uniformly deposited. When the ITO layer 60 is patterned according to the patterned photo resist, the pixel electrode does not have the originally designed shape. For example, the edges of the pixel electrode 4 do not reach the portion A and therefore, the edge of the pixel electrode has a reduced width W.

Therefore, the aperture ratio of the pixel electrode cannot be maximized. Furthermore, since the tearing-off portion of the pixel electrode does not generate an electrical field for driving the liquid crystal, the picture quality is inferior.

SUMMARY OF THE INVENTION

To overcome the problems described above, preferred embodiments of the present invention provide a method for patterning a thin layer to have an originally designed shape. Preferred embodiments of the present invention also provide a method for patterning a pixel electrode to have an originally designed shape. Another preferred embodiment of the present invention provides a method for manufacturing an LCD having a pixel electrode of which an aperture ratio is maximized. In addition, another preferred embodiment of the present invention provides a method for manufacturing the LCD which has a high picture quality resulting from a desired patterning of the pixel electrode.

In order to overcome problems with the conventional method and to achieve the advantages described in the preceding paragraph, preferred embodiments of the present invention provide a method of patterning the passivation layer which includes the steps of coating a photoresist to have a thickness of more than about 1.2 times of a thickness of the passivation layer, patterning the photoresist to have a predetermined shape, etching the passivation layer according to the patterned photoresist, removing the remaining photoresist and treating the surface of the passivation layer so as to form an $SiO_2$ thin layer on the passivation layer using $O_2$ gas and forming a pixel electrode on the passivation layer by depositing and patterning an ITO layer.

According to preferred embodiments of the present invention, even after the patterning of the passivation layer is finished, a thin photoresist layer still covers the passivation layer. Because the photoresist is about 1.2 times thicker than the passivation layer, all surfaces of the patterned passivation layer can be covered by the photo resist, even if the thickness of the photo resist is not uniform. Therefore, the passivation layer does not contact the etching gas so that the passivation layer is not over-etched by the etching gas.

After that, the remaining photo resist is removed via ashing with $O_2$. Then preferably, the ashing process continuously treats some surfaces of the passivation layer so that a thin $SiO_2$ layer is formed on the passivation layer.

BRIEF DESCRIPTION OF THE ATTACHED DRAWINGS

The present invention will be more fully understood from the detailed description given hereafter and the accompanying drawings which are provided as a way of illustration only and therefor not limited to the present invention and wherein.

DETAILED DESCRIPTION OF PREFERRED EMBODIMENTS

Figure 1:
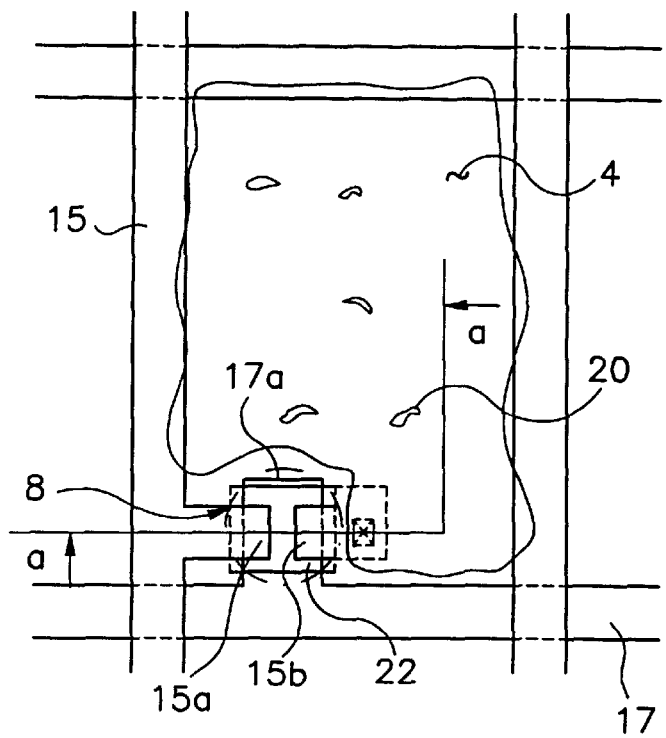
FIG. 1 is a plane view of the conventional liquid crystal display device.
Figure 2:
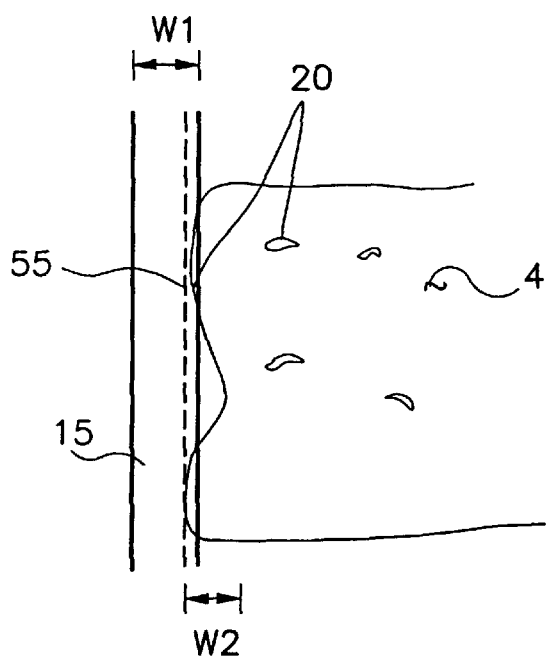
FIG. 2 is a plane view illustrating the pixel electrode having a distorted edge portion and tearing-off portions therein according to the conventional method.
Figure 3A:
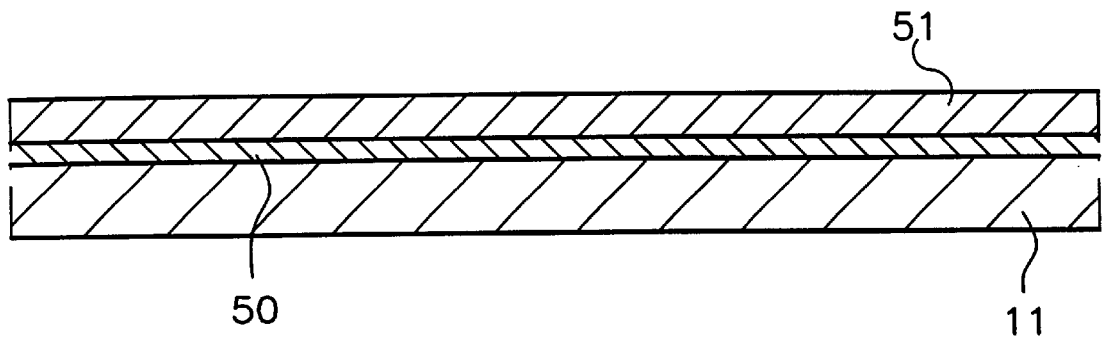
FIGS. 3a–3j show cross-sectional views for explaining a conventional method of manufacturing the liquid crystal display.
Figure 3B:
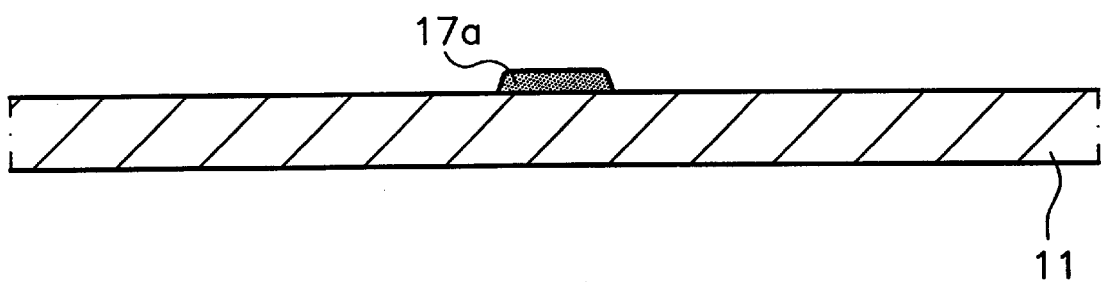
Figure 3C:
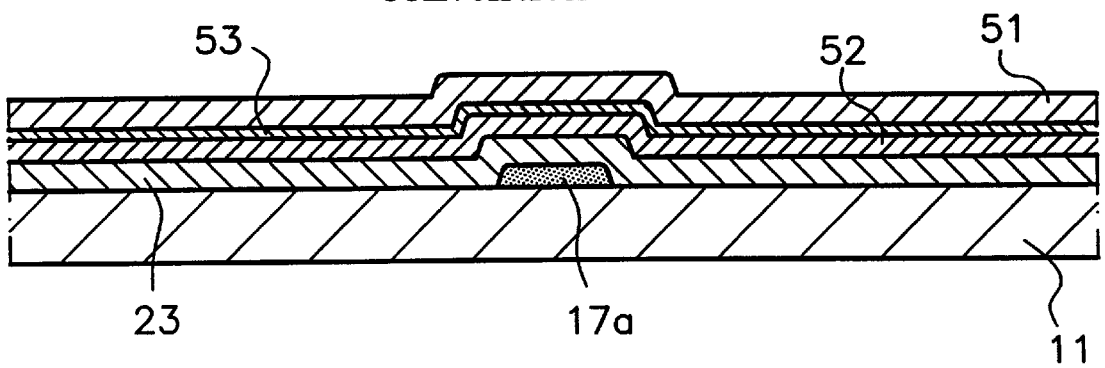
Figure 3D:
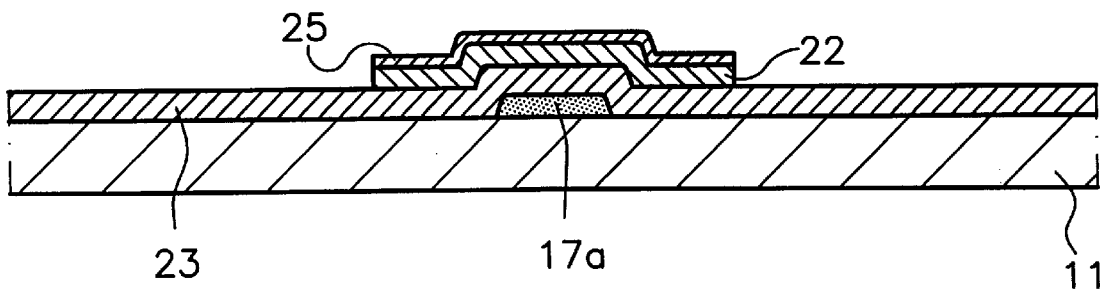
Figure 3E:
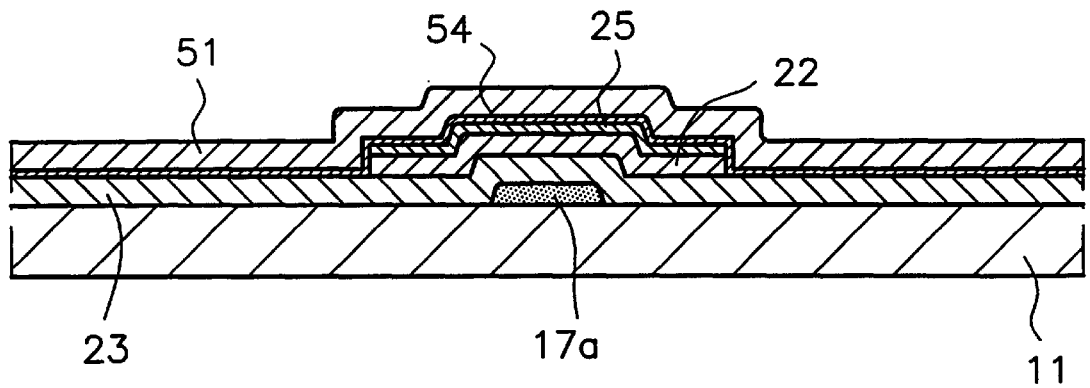
Figure 3F:
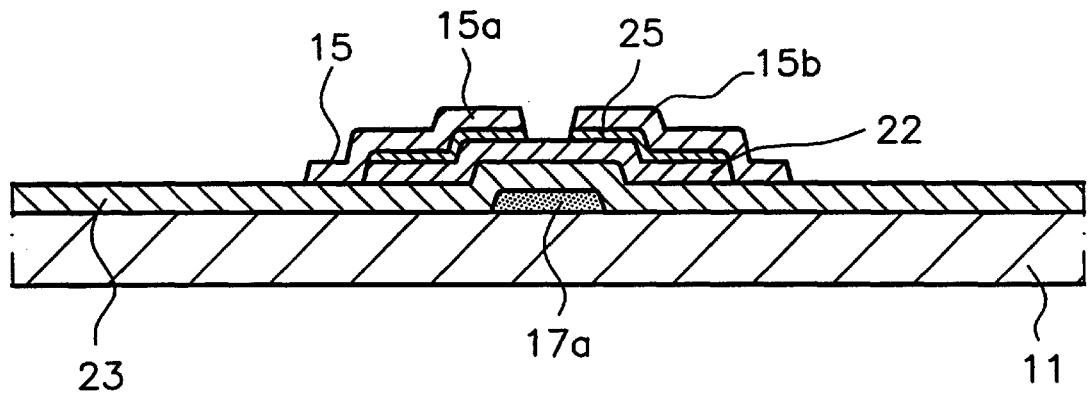
Figure 3G:
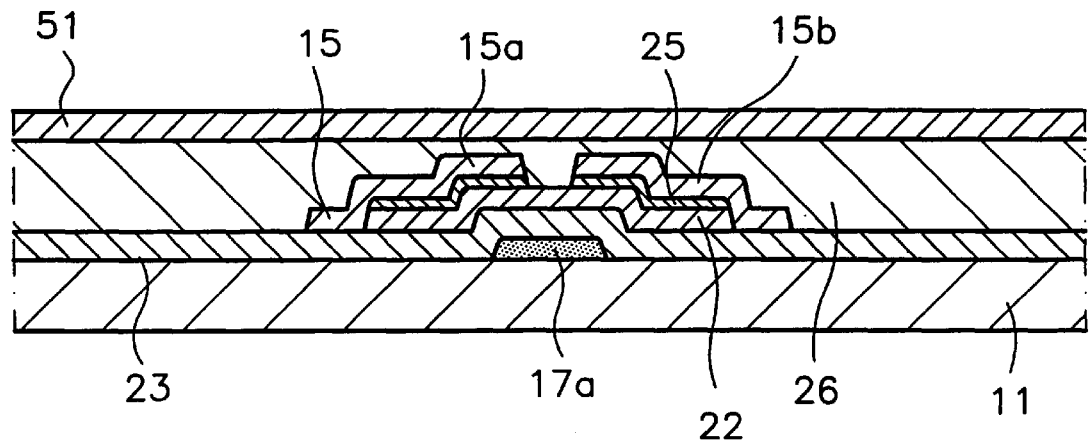
Figure 3H:
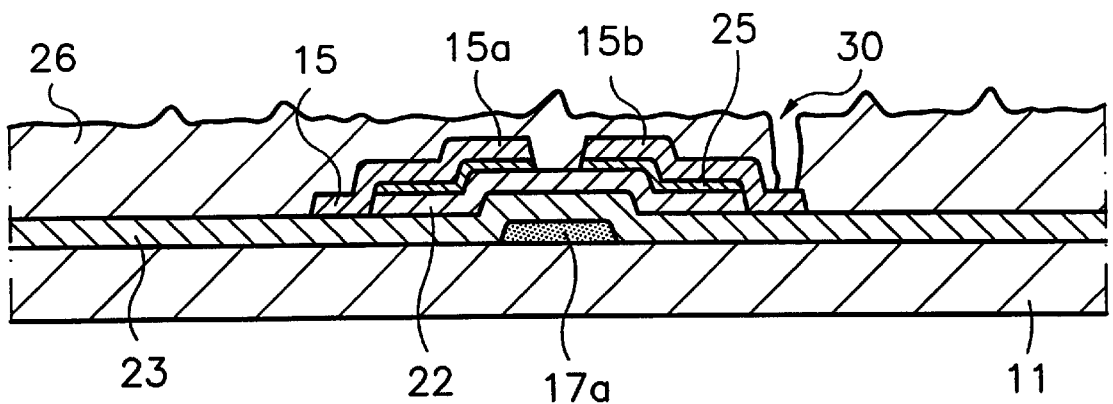
Figure 3I:
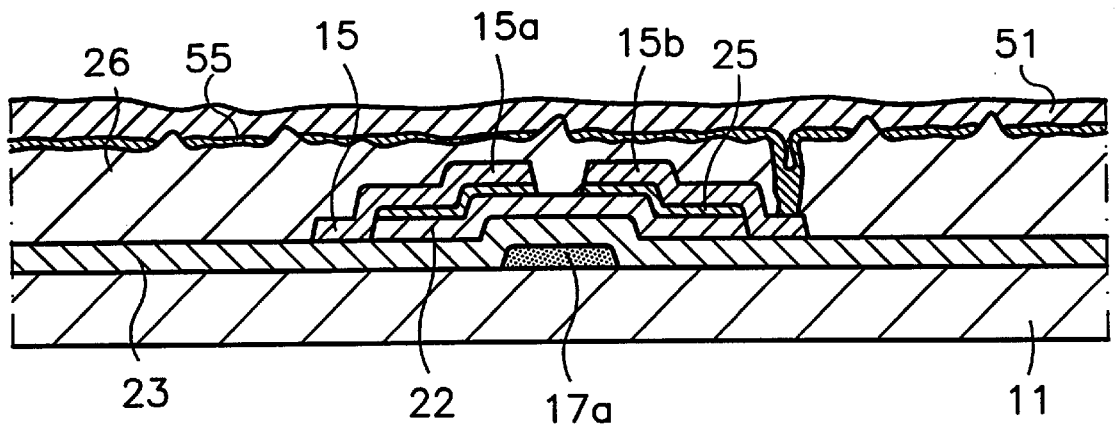
Figure 3J:
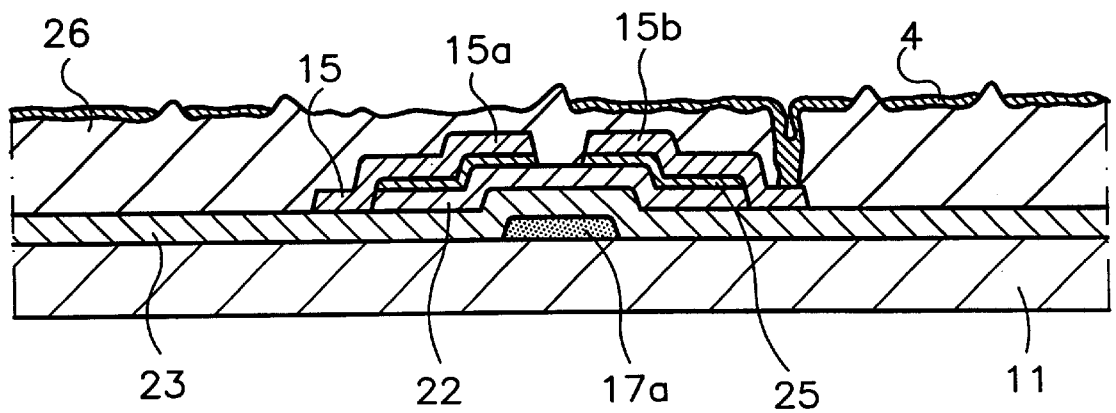
Figure 4:
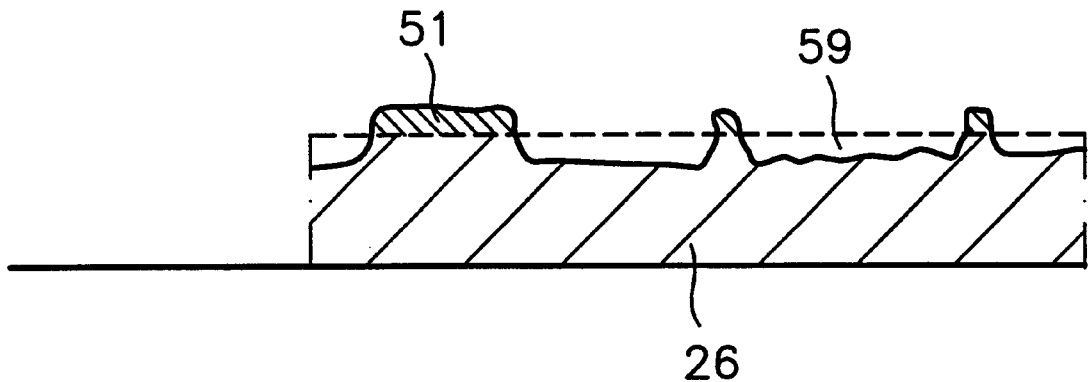
FIG. 4 is a cross-sectional view illustrating the uneven surface of the passivation layer after patterning according to the conventional method.
Figure 5:
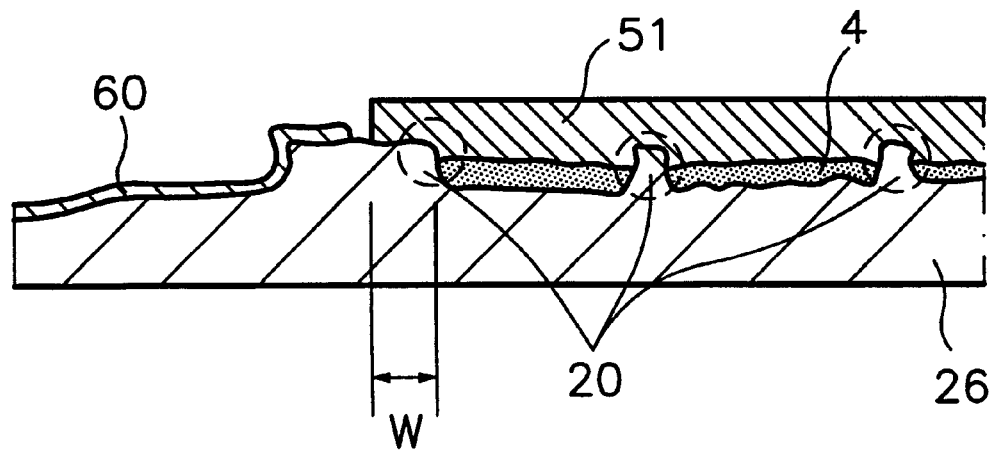
FIG. 5 is a cross-sectional view illustrating the patterned pixel electrode having an undesired patterning result according to the conventional method.
Figure 6:
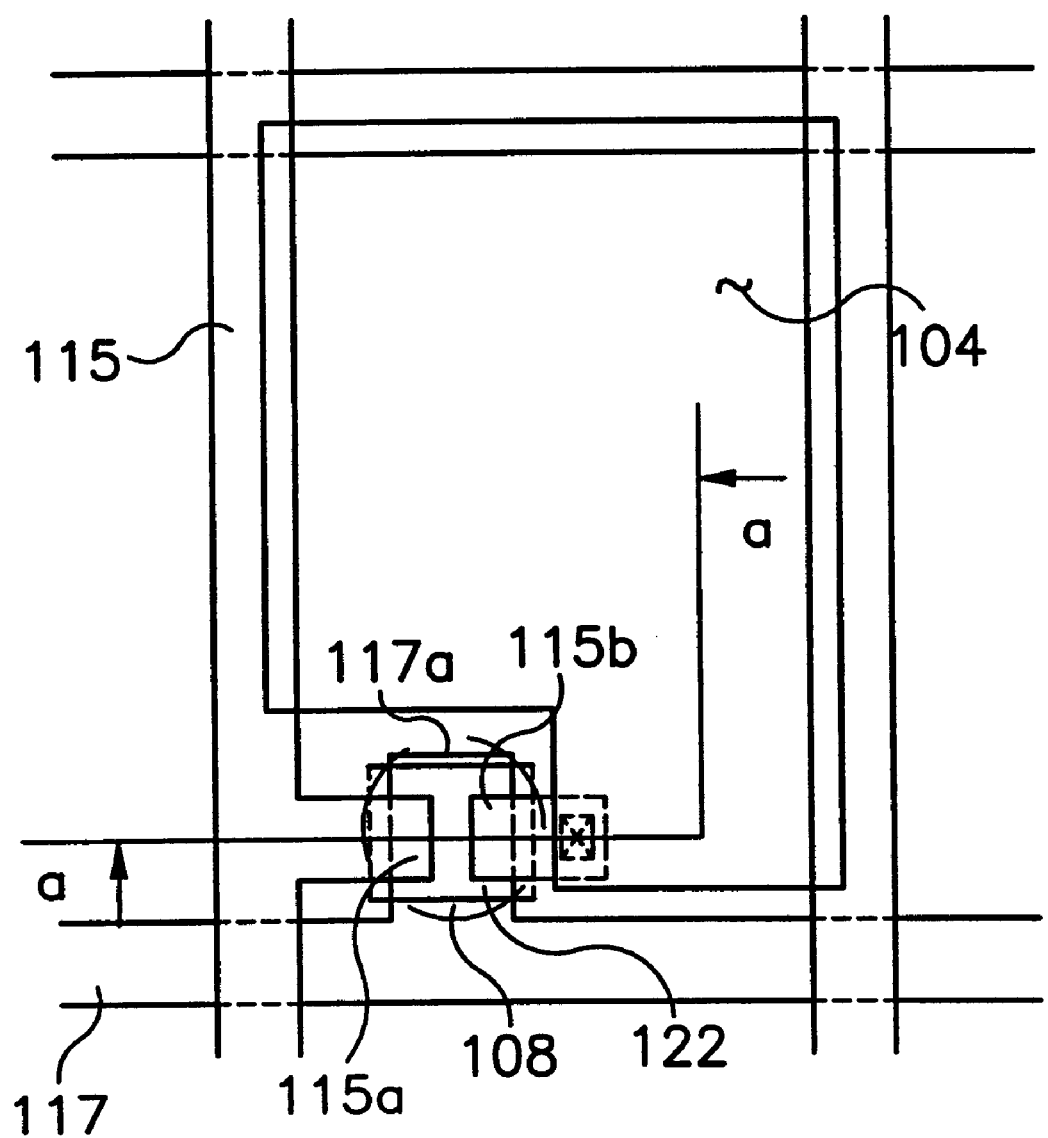
FIG. 6 is a plane view of a liquid crystal display according to a preferred embodiment of the present invention.

With reference to the figures, preferred embodiments of the present invention will be explained in detail. FIG. 6 is a plane view of a liquid crystal display having a pixel electrode patterned according to an original design of a preferred embodiment of the present invention. FIGS. 7a–7e are cross-sectional views showing a method for manufacturing a liquid crystal display which is cut along the a—a line of the FIG. 6.

On a transparent substrate 111, a gate electrode 117a derived from a gate line 117, a gate insulating layer 123, a semiconductor layer 122 and an ohmic contact layer 125, a source electrode 115a derived from a data line 115, and a drain electrode 115b are formed by the same conventional method as described above.

Figure 7A:
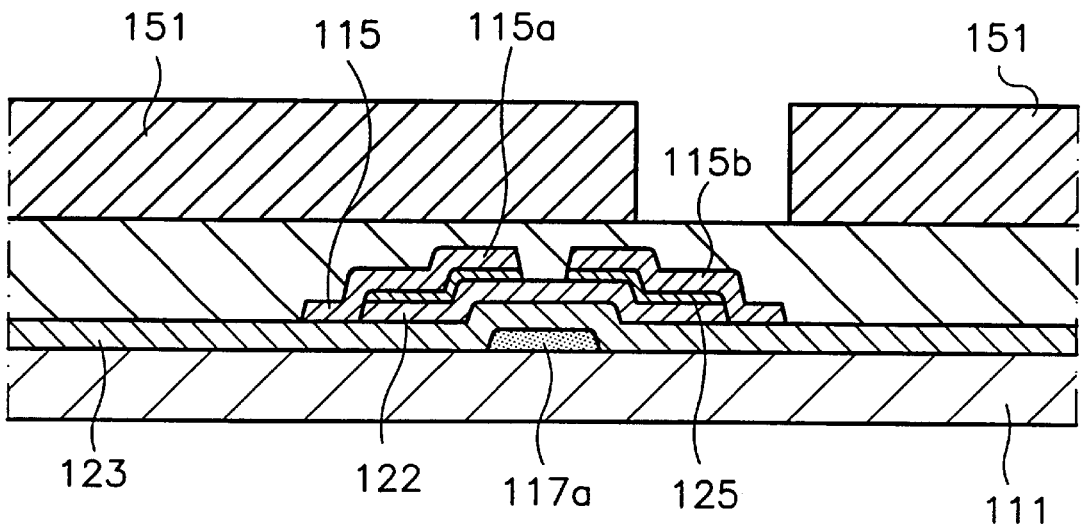
FIGS. 7a–7e show cross-sectional views for explaining a method for manufacturing a liquid crystal display according to a preferred embodiment of the present invention.

A passivation layer 126 including an organic material such as BCB is coated on the entire surface of the substrate 111 having the source 115a and the drain electrode 115b. A photoresist 151 is coated on the passivation layer 126 which is about 1.2 times thicker than the passivation layer 126. The photo resist 151 is patterned so as to have a predetermined shape wherein a contact hole for exposing the drain electrode 115b is formed as shown in FIG. 7A.

The substrate 111 having the patterned photo resist 151 is inserted into an etching chamber which is filled with $O_2/SF_6$ gas or $O_2/CF_4$ gas. Then, the exposed portions of the passivation layer start to be removed by changing into a volatile material $SiF_4$ which is generated by the chemical reaction of the Si functional group of the passivation layer and F radical of the $SF_6$ or $CF_4$ gas. As a result, a contact hole 130 exposing some portions of the drain electrode 115b is formed.

Figure 7B:
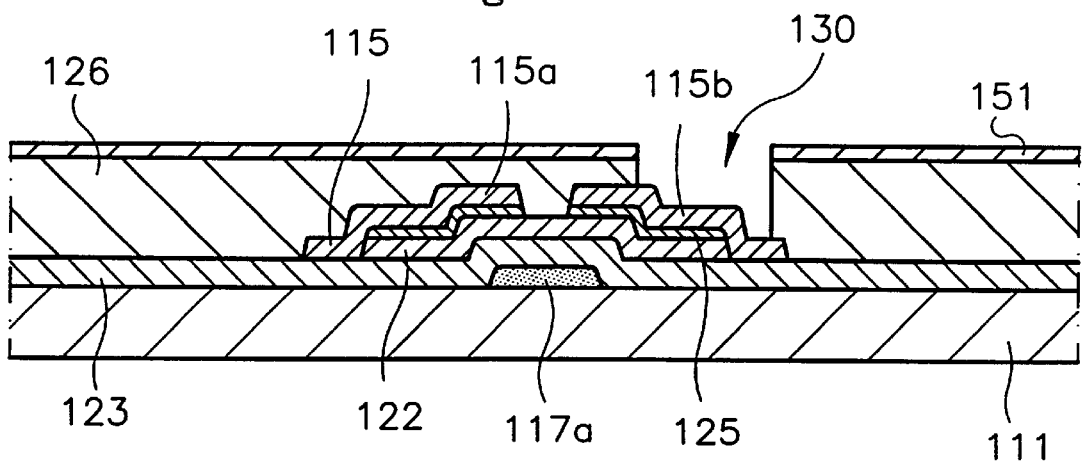

At the same time, the photoresist 151 starts to be ashed by the $O_2$ gas. Since the etching speed of the passivation layer 126 and the ashing speed of the photo resist are similar to each other, when the contact hole is formed, the photo resist having a thickness which is about 0.2 times that of the passivation layer remains as shown in FIG. 7b.

Figure 7C:
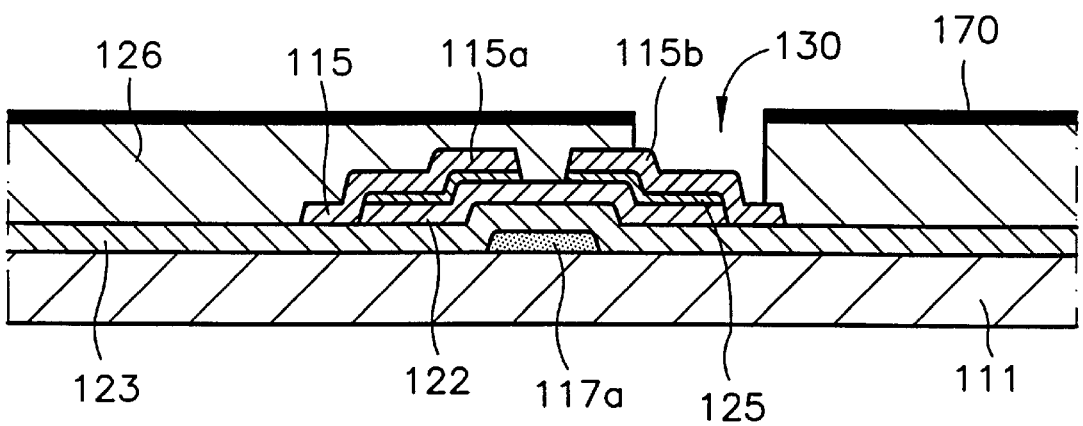

After removing the $SF_6$ or $CF_4$ gas from the etching chamber, the remaining photo resist is removed by ashing with only $O_2$ gas. After all of the photo resist material is removed, the ashing step is performed continuously in order to form a thin $SiO_2$ layer 170 on the passivation layer by ashing with the $O_2$ gas as shown in FIG. 7C.

In another method, the remaining photo resist is removed by using an organic mixture solution including NMP (or N-Methyl-Pyrrolidone), alcohol and amine, then a SiO2 thin layer 170 is formed by treating the surface of the passivation layer with $O_2$ gas.

As a result of preferred embodiments of the present invention, the passivation layer is not exposed to the $SF_6$ or $CF_4$, so the passivation layer is not over-etched by these gases and as a result, the passivation layer has a uniform surface. For example, when $O_2/CF_4$ gas is used for an etching gas, the ratio of the composed atoms at the surface of the over-etched passivation layer is determined to be Si:C:O:F=24.3:21.6:52.3:0. According to the atom ratio, the surface of the passivation layer does not react with the F radical of the $CF_4$.

In this preferred embodiment, even though the etching gas is either $SF_6$ gas and $CF_4$ gas, the etching gas can be changed according to the material of the passivation layer.

Figure 7D:
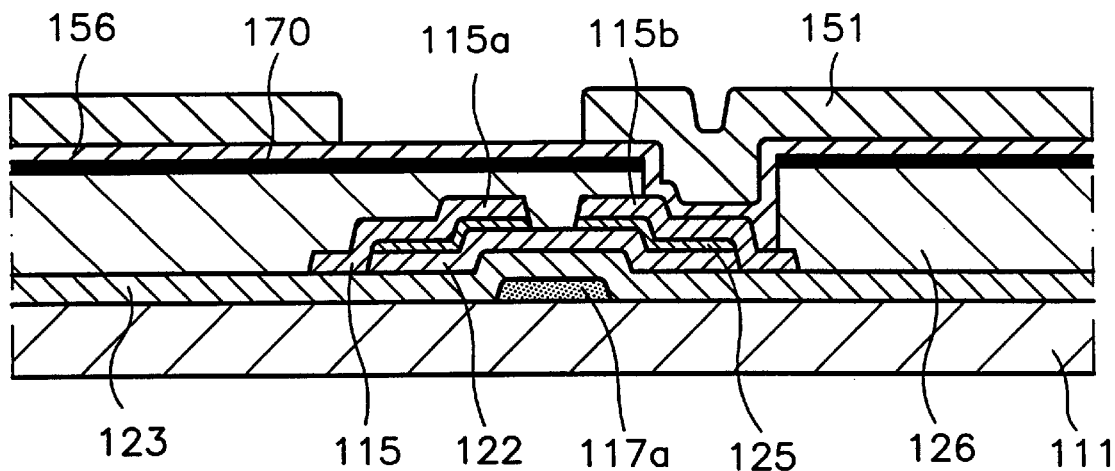
Figure 7E:
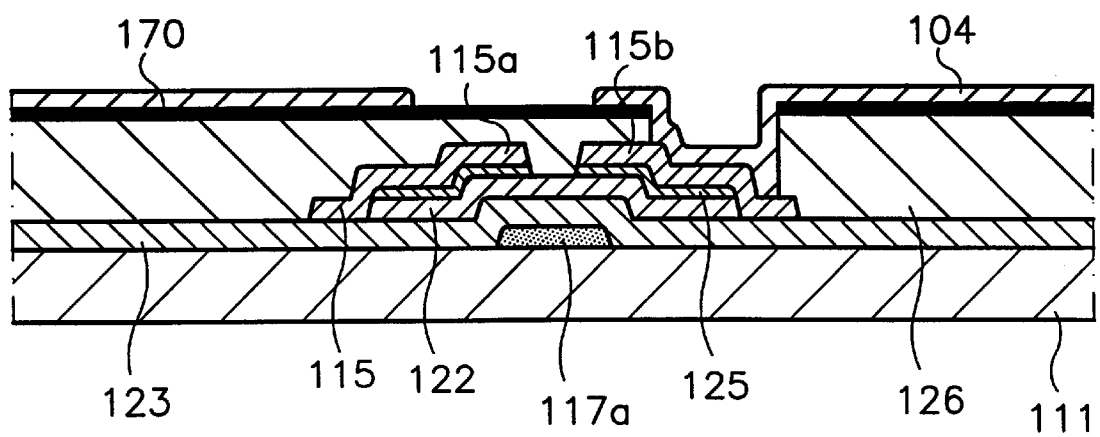

On the entire surface of the substrate 111 having the contact hole 130, an ITO (Indium Tin Oxide) 156 is deposited so as to have a thickness of about 500 Å. Photoresist 151 is coated on the ITO layer 156 and patterned to have a predetermined shape as shown in FIG. 7D.

According to the patterned photo resist 151, the ITO layer 156 is patterned via wet etching method to form a pixel electrode 104. Because the passivation layer has a low dielectric constant (lower than 3.0) and an even surface, the pixel electrode 104 can be overlapped with some portions of the data line and gate line.

As described above, according to preferred embodiments of the present invention, because the photoresist for patterning the passivation layer is thicker than that of the passivation layer, even though the patterning of the passivation layer is finished, the photoresist still prevents the passivation layer from reacting with the etching gas. Therefore, the passivation layer has a uniform surface after the patterning.

So, the pixel electrode formed on the passivation layer can be patterned to have an originally designed shape. Therefore, the LCD includes a pixel electrode having a maximum aperture ratio and an excellent quality of the picture.

While the invention has been particularly shown and described with reference to preferred embodiments thereof, it will be understood by those skilled in the art that the forgoing and other changes in form and details may be made therein without departing from the spirit of the invention.

What is claimed is:

1. A method for manufacturing a liquid crystal display comprising the steps of:

coating a passivation layer on a substrate having a data line, a gate line and a switching element;

forming a photoresist on the passivation layer so that the photoresist has a predetermined shape and a thickness that is more than about 1.2 times that of the passivation layer;

patterning the passivation layer according to the patterned photo resist to form a contact hole exposing one electrode of the switching element and so that a portion of the photoresist remains on the entire surface of the unetched passivation layer after the patterning step is completed;

removing the portion of the photoresist remaining on the passivation layer; and forming a pixel electrode on the passivation layer to contact the electrode of the switching element through the contact hole.

2. The method of claim 1, wherein the passivation layer comprises an organic insulating layer including an Si bond structure.

3. The method of claim 2, wherein the organic insulating layer comprises benzocyclobutene.

4. The method of claim 1, wherein the etching gas comprises at least one selected from the group consisting of $CF_4$ gas and $SF_6$ gas.

5. The method of claim 1, wherein the step of removing the portion of the photoresist remaining on the passivation layer includes the step of removing the portion of the photoresist remaining on the passivation layer by ashing with $O_2$ gas and such that the entire surface of the passivation layer is treated by the $O_2$ gas continuously.

6. The method of claim 1, wherein the pixel electrode overlaps at least one of the data line and gate line.

7. The method of claim 1, wherein the portion of the photoresist remaining on the passivation layer is removed by stripping using an organic mixture solution including NMP (N-Methyl-Pyrrolidone), alcohol and amine.

8. The method of claim 1, wherein when the contact hole is formed, the photoresist has a thickness that is about 0.2 times that of the passivation layer.

9. A method for manufacturing a liquid crystal display comprising the steps of:

coating a passivation layer on a substrate having a data line, a gate line and a switching element;

forming a photoresist on the passivation layer so that the photoresist has a predetermined shape and has a thickness that is more than about 1.2 times that of the passivation layer;

patterning the passivation layer to form a contact hole exposing one electrode of the switching element so that a portion of the photoresist remains on the entire surface of the unetched passivation layer after the patterning step is completed;

removing the portion of the photoresist remaining on the passivation layer; and forming a pixel electrode on the passivation layer to contact the electrode of the switching element through the contact hole.

10. The method of claim 9, wherein the passivation layer comprises an organic insulating layer including an Si bond structure and the organic insulating layer comprises benzocyclobutene.

11. The method of claim 9, wherein the etching gas comprises at least one selected from the group consisting of $CF_4$ gas and $SF_6$ gas.

12. The method of claim 9, wherein the step of removing the portion of the photo resist remaining on the passivation layer includes the step of removing the portion of the photoresist remaining on the passivation layer by ashing with $O_2$ gas and such that the entire surface of the passivation layer is treated by the $O_2$ gas continuously.

13. The method of claim 9, wherein the portion of the photoresist remaining on the passivation layer is removed by stripping using an organic mixture solution including NMP (N-Methyl-Pyrrolidone), alcohol and amine.

14. The method of claim 9, wherein when the contact hole is formed, the photoresist has a thickness that is about 0.2 times that of the passivation layer.

* * * * *